United States Patent [19]

Stotz et al.

[11] 4,213,632

[45] Jul. 22, 1980

[54] REAR AXLE SUSPENSION

[75] Inventors: Erich Stotz, Rommelshausen; Rolf Sivers, Warmbronn, both of Fed. Rep. of Germany

[73] Assignee: Dr. Ing. h.c.F. Porsche Aktiengesellschaft, Fed. Rep. of Germany

[21] Appl. No.: 933,982

[22] Filed: Aug. 16, 1978

[30] Foreign Application Priority Data

Aug. 16, 1977 [DE] Fed. Rep. of Germany ....... 2736826

[51] Int. Cl.² .............................................. B60G 11/44
[52] U.S. Cl. ................................. 280/697; 267/57.1 R; 280/715; 280/721
[58] Field of Search ............... 280/697, 699, 700, 715, 280/717, 720, 721, 723; 267/11 R, 57, 57.1 R, 63 A

[56] References Cited

U.S. PATENT DOCUMENTS

| 3,205,967 | 9/1965 | Stotz | 280/700 |
| 3,284,095 | 11/1966 | Allison | 280/721 |
| 4,046,415 | 9/1977 | Klees | 267/63 A |
| 4,139,246 | 2/1979 | Mikoshiba | 267/57.1 R |

Primary Examiner—John J. Love
Assistant Examiner—John A. Carroll
Attorney, Agent, or Firm—Craig & Antonelli

[57] ABSTRACT

An independently suspended wheel rear axle suspension for motor vehicles of the torsion spring type is improved by the provision of a bolster that is designed for reducing the suspension space requirements, while providing optimal noise damping and stable wheel guidance. The improved bolster includes, according to a preferred embodiment, a thrust bearing, a rigid longitudinal support that is connected to the vehicle body by the thrust bearing for providing only vibration insulation and guiding, a support bearing, and a resilient spring member connected to the vehicle body by the support bearing for receiving the preponderant torque of the torsion spring and the vehicle weight, while providing vibration insulation. The longitudinal support means is mounted so as to be elastically displaceable under the influence of forces in the vehicle longitudinal direction, while being relatively rigid under the influence of forces in the vehicle transverse direction. The spring member is constructed so as to be elastic crosswise to the direction of vehicle travel for correcting for the effects of lateral and peripheral forces on a wheel of the vehicle.

15 Claims, 4 Drawing Figures

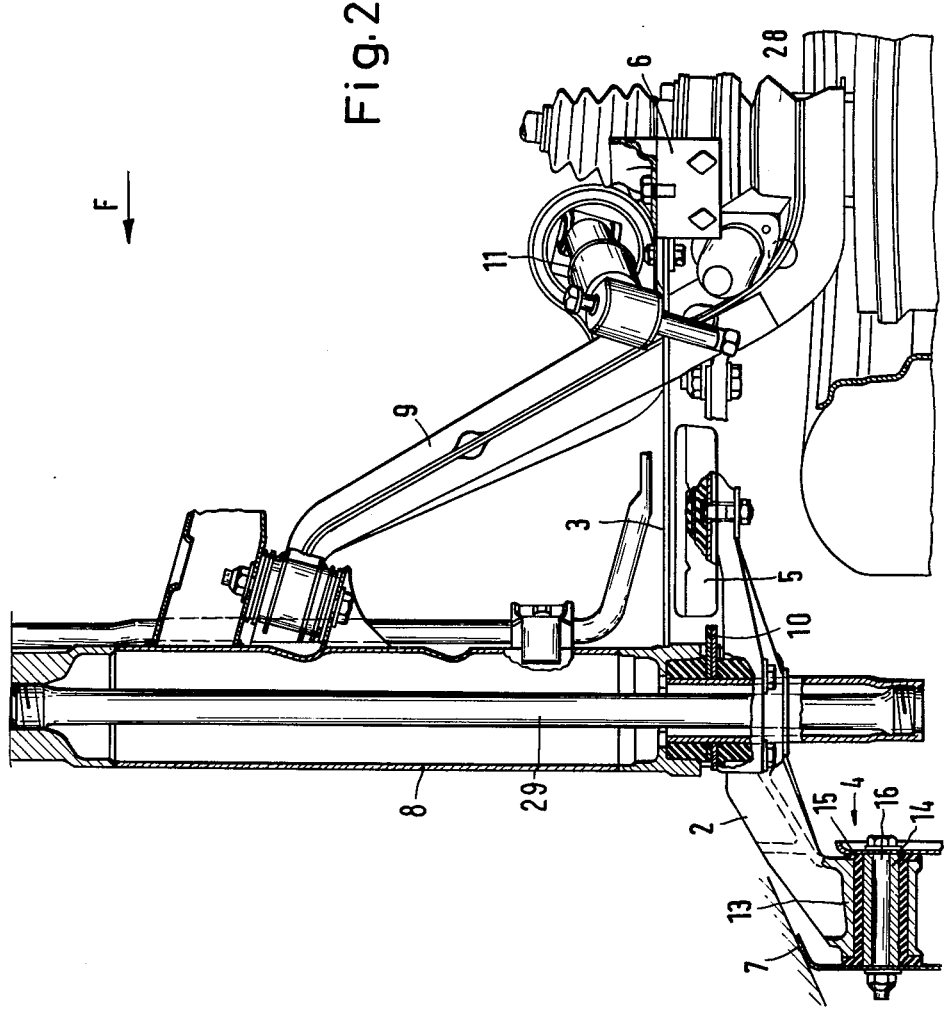

REAR AXLE SUSPENSION

BACKGROUND AND SUMMARY OF THE INVENTION

The invention concerns a rear axle suspension for vehicles, especially automotive vehicles, with independently suspended wheels that are braced by torsion spring elements against a bolster, whereby the bolster is elastically connected with the vehicle frame or body.

It is known (German Pat. No. 1,117,016) that shocks coming from the roadway can be damped via an auxiliary frame elastically suspended on the vehicle body, the wheels being suspended on the said frame. Moreover, a wheel suspension for automotive vehicles is known (German AS 1,265,598) wherein the wheels are independently braced against a bolster via a torsion bar spring, the said bolster again being connected via elastic rubber cushions with the body of the vehicle. In such an arrangement, all elastic elements between the body or frame and the bolster are fractionally loaded with the weight of the vehicle and must therefore be designed for damping of vibration and also for acceptance of weight. In addition, the frame and the bearings (German Pat. No. 1,177,016) entail a space requirement which is not available in the case of small low vehicles, e.g. sports cars. In these known embodiments of a bolster, stable guiding of the wheel is not ensured, because of the elasticity of the bearings in the longitudinal and transverse direction of the vehicle.

The present invention therefore is intended to provide a bolster that offers optimal damping of the roll noise with stable travel and structurally simple bearings and bolster parts, whose dispostion in the vehicle yields favorable conditions with respect to the space requirements for placement of the bolster.

This problem is solved according to a preferred embodiment of the invention in that the bolster comprises two supports running in the longitudinal direction of the vehicle, whereof, seen in the direction of travel, the forward support is made as a rigid part and is braced on the vehicle body via elastic bearings so as to be insulated against vibration, and the rear support consists of a spring member that is elastic in the transverse direction of the vehicle and is connected with the vehicle body via an elastic bearing, to take up vibration and torque.

According to another characteristic of the invention, a rigid longitudinal support presents a seat for a transverse axle pipe as well as, seen in the direction of travel, the forward guide bearing and the rear thrust bearing. The rear thrust bearing of the longitudinal support, according to a feature of the invention, is relatively unyielding, to receive forces in the transverse direction of the vehicle.

Another feature of the invention provides that, between the vehicle body and the longitudinal support, there be an elastic element which has greater elasticity vertically or almost vertically than it has in the horizontal or almost horizontal direction, crosswise to the longitudinal axis of the vehicle. Moreover, it is provided according to an embodiment disclosed with respect to the invention that the spring member, seen in the direction of travel, is connected to the transverse axle pipe at its forward end, and with the vehicle body at its rear free end via a thrust bearing. The thrust bearing is disposed on the free end of the spring member above the wheel axle and about in the perpendicular midplane of the wheel. Further, it is provided according to the invention that the thrust bearing presents an elastic element which is more elastic in the longitudinal and transverse directions of the vehicle than in the vertical direction. The arrangement of the rear axle suspension offers the advantage of a vibration-insulated fixation of the rear axle on the vehicle body, whereby roll noise is substantially reduced and the travel behavior of the motor vehicle remains unaffected by negative disrupting moments in case of peripheral and lateral forces. Moreover, a structurally simple construction and arrangement of the bolster is achieved, which can be built into a car even supplementarily, and which is space-saving, not reducing trunk and/or interior space. The bolster has the additional advantage that by its construction there can be a division of functions so that one bolster part (the longitudinal support) or the guide and thrust bearing between this bolster part and the vehicle body can be called on only for vibration insulation and guiding, and be relieved of the other forces or the weight of the body, while the other bolster part (the spring member) or the support bearing can be used for the preponderant receiving of the torque of the torsion bar spring or the weight of the body and for vibration insulation as well. In this way, essentially the bearings that are solely vibration insulating can be made very soft in the direction that receives the vibration. Thus, by a separation of functions there is avoidance of a great outlay in construction. Hereby, only one more bearing on the spring member is necessary, through which the forces of the body or the torque of the torsion bar spring will be taken up.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 2 is a top view of FIG. 1, partly in section;

DETAILED DESCRIPTION OF THE PREFERRED EMBODIMENT

Figure 1:
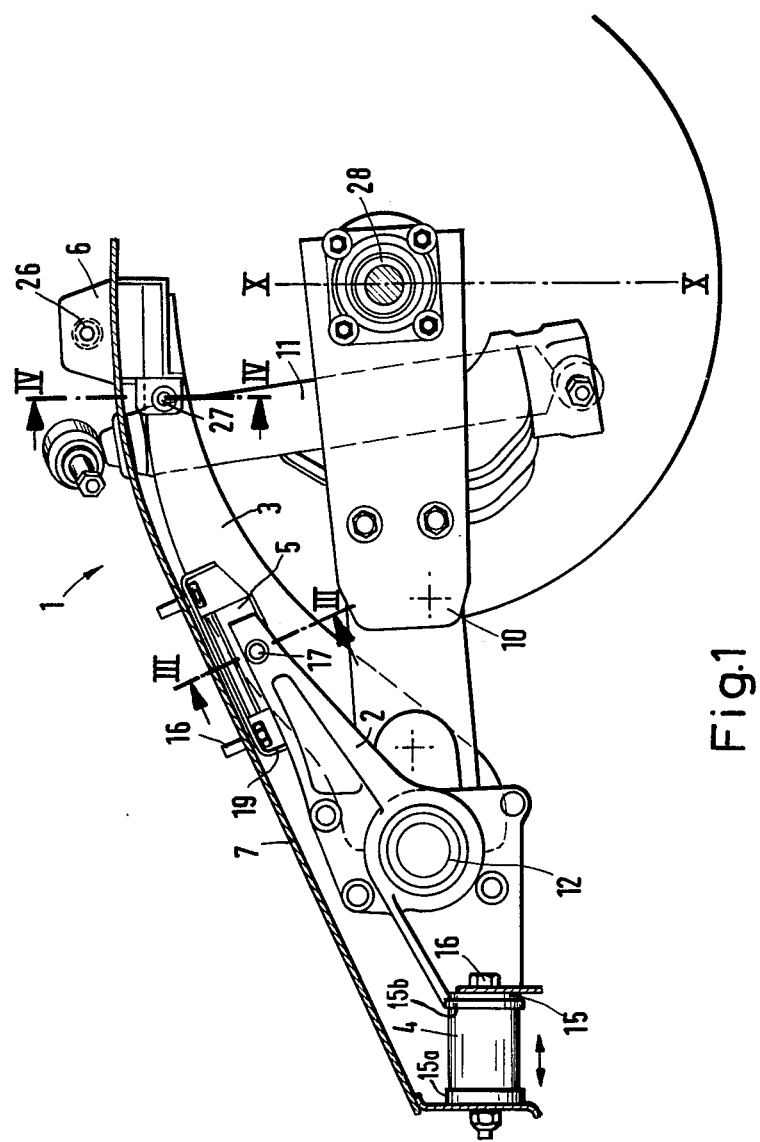
FIG. 1 is a lateral view of the bolster.
Figure 4:
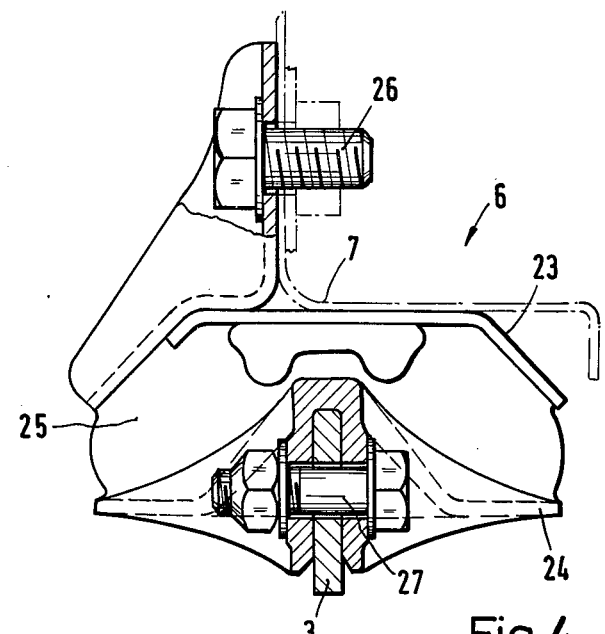
FIG. 4 is a section along line IV—IV of FIG. 1, through a support bearing.
Figure 3:
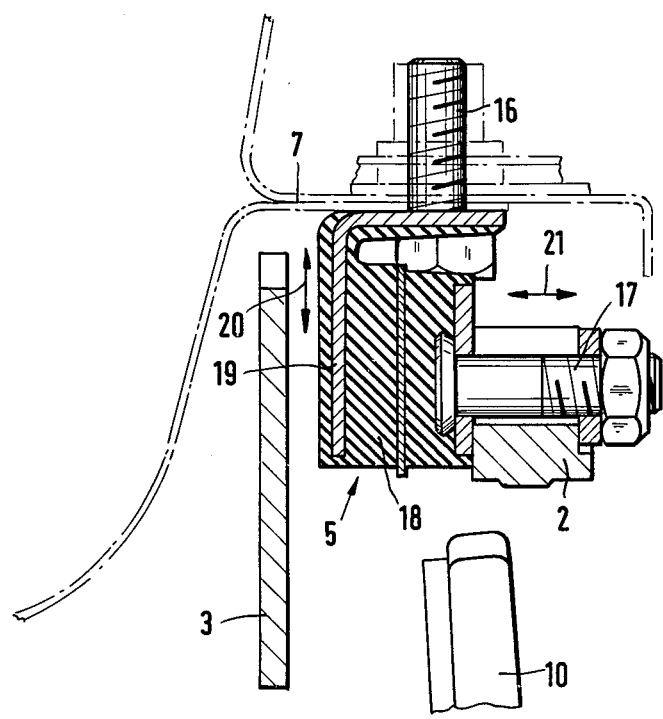
FIG. 3 is a section along line III—III of FIG. 1, through a thrust bearing.

A bolster indicated generally at 1 comprises a longitudinal support 2 and a laterally elastic spring member 3, and is connected via bearings 4, 5 and 6 to the vehicle frame or body 7 so as to be insulated from vibration. A bolster 1 is provided on each wheel side. The rear axle is suspended on bolster 1, whereby the longitudinal support 2 supports the rear axle transverse pipe 8 with torsion bar springs 9 and the longitudinal support 2 is fastened at its forward end, seen in the direction of travel F, to rear axle transverse pipe 8. The wheel guide rods 29 and 10 are borne on the rear axle transverse pipe 8, whereby one of these members 10 is a longitudinal rod that is connected with torsion bar spring 9. The wheel guide rods are braced against vehicle body 7 via a damping leg (shock absorber) 11.

The longitudinal support 2 of bolster 1 extends in the longitudinal direction of the vehicle and comprises a rigid structural part, and presents in its middle the bearing 12 for the rear axle transverse pipe 8. On the forward and rear free ends of support 2, there are respectively bearings 4 and 5, whereby the forward bearing 4 has the function of a guide bearing and the rear bearing 5 has the function of a thrust bearing.

Guide bearing 4 is disposed in a bearing eye 13 of longitudinal support 2, and constitutes an elastic vibration-insulated connection to vehicle body 7. For this, there is an elastic bushing 15 introduced between a sleeve 14 of bearing 4 and bearing eye 13, having such elasticity that the longitudinal support 2 has an elastic displacement counter to or in the longitudinal direction of the vehicle. There is also a favorable effect on the roll noise damping if the elasticity counter to direction of travel is greater than in the direction of travel F, which can be achieved by forming portions of elastic bushing 15 of differing elasticies or by making its forward flange 15a thicker than its rearward flange 15b. In the transverse direction on the contrary, guide bearing 4 has only slight elasticity. Fastening of guide bearing 4 is by means of a bolt 16 that passes through sleeve 14 and is fixed to body 7.

Thrust bearing 5 on the rear (seen in the direction of travel F) free end of longitudinal support 2 constitutes an elastic vibration-insulated connection between body 7 and longitudinal support 2. For this, thrust bearing 5 consists of a bracing block 18 of elastic material, between fastening bolts 16 and 17. Elastic block 18 is so designed that it is softer in the vertical direction of load 20 than it is in the horizontal direction of load 21, perpendicular to the long axis of the vehicle. Thrust bearing 5 can be connected to body 7 by the bolt 16 which is disposed almost vertically on bearing housing 19. Bolt 17 is disposed at a right angle with respect to bolt 16 and constitutes a connection to longitudinal support 2.

By this arrangement, jolts on the wheel can be taken up elastically and absorbed. Moreover, changes in the position of the wheel in case of peripheral forces are avoided and there is stable guidance.

Spring member 3 of bolster 1 is disposed on edge and in the transverse direction of the vehicle it is elastic, similar to a leaf spring, and on its free end it supports a support bearing 6 which, in addition to bearings 4 and 5 offers an elastic and vibration-insulated connection to body 7, as a third bearing of bolster 1. This elasticity of spring member 3 in the transverse direction of the vehicle serves elastically to take up changes in the wheel position due to lateral and peripheral forces on the wheel, and also serves to restore the wheel to its correct position.

This support bearing 6 also is intended to take up the torque applied by torsion rod spring 9 and thus to relieve the other two bearings 4 and 5 of the longitudinal support 2 of this load.

To be able to take up the torque and to relieve the other two bearings 4 and 5 of longitudinal support 2 of this load, it is necessary that support bearing 6 be disposed above wheel bearing 28, somewhat in the perpendicular transverse mid-plane x—x.

Support bearing 6 comprises a bearing housing in which an elastic bearing element 25 is vulcanized in between a bearing housing upper part 23 and a bearing housing lower part 24, said element 25 being disposed between vehicle body 7 and spring member 3. The fastening of bearing 6 to body 7 is effected by a bolt 26 on bearing housing upper part 23, and that of spring member 7 is effected by a bolt 27 on bearing housing lower part 24. Elasticities of support bearing 6 are practically equal in the vertical and transverse directions.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. In a rear axle suspension for vehicles, especially automotive vehicles, with independently spring-suspended wheels that are braced against a bolster by torsion spring elements, whereby the bolster is elastically connected with the vehicle frame or body, the improvement wherein the bolster comprises forward and rear supports which run in the longitudinal direction of the vehicle, whereof the forward support, as seen in the direction of travel, is made as a rigid part, elastic bearings being provided by which the resilient member is braced on the vehicle body and insulated from vibration, and the rear support is formed by a resilient member that is elastic crosswise to the direction of vehicle travel, a further elastic bearing being provided by which the resilient member is connected to the vehicle body to take up vibration and torque.

2. A suspension as in claim 1, wherein the forward support is connected with a bearing for a transverse axle pipe, a forward guide bearing, and a rear thrust bearing.

3. A suspension as in claim 1 or 2, wherein a forward guide bearing is provided which elastically displaceably connects the forward support with the vehicle body to receive longitudinal forces in the longitudinal direction of the vehicle.

4. A suspension as in claim 1 or 2, wherein a rear thrust bearing of the forward support is made to receive forces in the transverse direction of the vehicle with relative rigidity.

5. A suspension as in claim 4, wherein the thrust bearing includes an elastic element between the vehicle body and the forward support, which elastic element has greater elasticity in substantially vertical directions than it does in substantially horizontal directions, crosswise to the longitudinal axis of the vehicle.

6. A suspension as in claim 1, wherein the resilient member, seen in the direction of travel, is connected at its forward end to a transverse axle pipe and at its rear free end to the vehicle body via said further bearing.

7. A suspension as in claim 1 or 6, wherein the further bearing is disposed at the free end of the resilient member above a wheel axle, about in the perpendicular transverse midplane thereof.

8. A suspension as in claims 1 or 6, wherein the further bearing includes an elastic element which is more elastic in the longitudinal and transverse directions of the vehicle than it is vertically.

9. A suspension as in claim 4, wherein the resilient member, seen in the direction of travel, is connected at its forward end to a transverse axle pipe and at its rear free end to the vehicle body via said further bearing.

10. A suspension as in claim 9, characterized in that the further bearing is disposed at the free end of the resilient member above a wheel axle, about in the perpendicular transverse midplane thereof.

11. In an independently suspended wheel rear axle suspension for motor vehicles of the torsion spring type, the improvement comprising bolster means for reducing the suspension space requirements while providing optimal noise damping and stable wheel guidance, said bolster means including a thrust bearing, a rigid longitudinal support means connected to the vehicle body by said thrust bearing for providing only vibration insulation and guiding, a support bearing, and resilient means connected to the vehicle body by said support bearing for receiving the preponderant torque of the torsion spring and the vehicle weight while providing vibration insulation.

12. A suspension according to claim 11, wherein said longitudinal support means is mounted so as to be elastically displaceable under the influence of forces in the vehicle longitudinal direction while being relatively rigid under the influence of forces in the vehicle transverse direction.

13. A suspension according to claim 12, wherein said longitudinal support means is connected to said thrust bearing at a rearward end and to a guide bearing at a forward end.

14. A suspension according to claims 11 or 12 or 13, wherein the resilient means is a spring member constructed so as to be elastic crosswise to the direction of vehicle travel for correcting for the effects of lateral and peripheral forces on a wheel of the vehicle, said spring member being connected at a forward end to a transverse axle pipe and at a rear end to said support bearing.

15. A suspension according to claim 14, wherein said support bearing is constructed so as to be more elastic in the vehicle longitudinal and transverse directions than it is vertically.

* * * * *